United States Patent
Brennan, Jr. et al.

(10) Patent No.: US 10,527,515 B2
(45) Date of Patent: Jan. 7, 2020

(54) ULTRASONIC FLOW METER LEAK DETECTION SYSTEM AND METHOD

(71) Applicant: NEPTUNE TECHNOLOGY GROUP INC., Tallassee, AL (US)

(72) Inventors: William James Brennan, Jr., Montgomery, AL (US); Michael Allen Wilson, Tallassee, AL (US); Wyatt Edward Northrup, Auburn, AL (US)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 295 days.

(21) Appl. No.: 15/273,447

(22) Filed: Sep. 22, 2016

(65) Prior Publication Data

US 2017/0307466 A1   Oct. 26, 2017

Related U.S. Application Data

(60) Provisional application No. 62/325,825, filed on Apr. 21, 2016.

(51) Int. Cl.
| | |
|---|---|
| G01F 1/66 | (2006.01) |
| G01M 3/24 | (2006.01) |
| G01M 3/28 | (2006.01) |

(52) U.S. Cl.
CPC ............ *G01M 3/2807* (2013.01); *G01F 1/66* (2013.01); *G01F 1/666* (2013.01); *G01M 3/243* (2013.01)

(58) Field of Classification Search
CPC ...... G01M 3/2807; G01M 3/243; G01M 3/24; G01F 1/666; G01F 1/66

USPC ...... 73/592, 40.5 A, 861.27, 861.28, 861.29, 73/861.31
See application file for complete search history.

(56) References Cited

U.S. PATENT DOCUMENTS

| | | | |
|---|---|---|---|
| 5,548,530 A | 8/1996 | Baumoel | |
| 8,548,754 B2* | 10/2013 | Iwamoto | F17D 5/06 702/47 |
| 2004/0128034 A1* | 7/2004 | Lenker | G05D 7/0635 700/282 |
| 2012/0007743 A1 | 1/2012 | Solomon | |
| 2012/0285221 A1 | 11/2012 | Al-Qahtani et al. | |
| 2013/0047743 A1 | 2/2013 | Sonnenberg et al. | |
| 2014/0005958 A1 | 1/2014 | Baliga | |

FOREIGN PATENT DOCUMENTS

| | | | |
|---|---|---|---|
| JP | 2012107966 | 6/2012 | |
| WO | 2012136209 | 10/2012 | |
| WO | 2013056235 | 4/2013 | |
| WO | 2014066764 A1 | 5/2014 | |
| WO | WO-2015073313 A1 * | 5/2015 | ............ E03B 7/071 |
| WO | 2016025919 A1 | 2/2016 | |

* cited by examiner

*Primary Examiner* — Lisa M Caputo
*Assistant Examiner* — Rose M Miller
(74) *Attorney, Agent, or Firm* — Snyder, Clark, Lesch & Chung, LLP

(57) ABSTRACT

The use of ultrasonic transducers installed in utility meters is provided for the detection of fluid leaks in a conduit. Such transducers are normally used to transmit acoustic waves in order to measure the velocity of fluid flow, but it is disclosed that such transducers are also capable of detecting leak noises in addition to such transmitted acoustic waves.

14 Claims, 1 Drawing Sheet

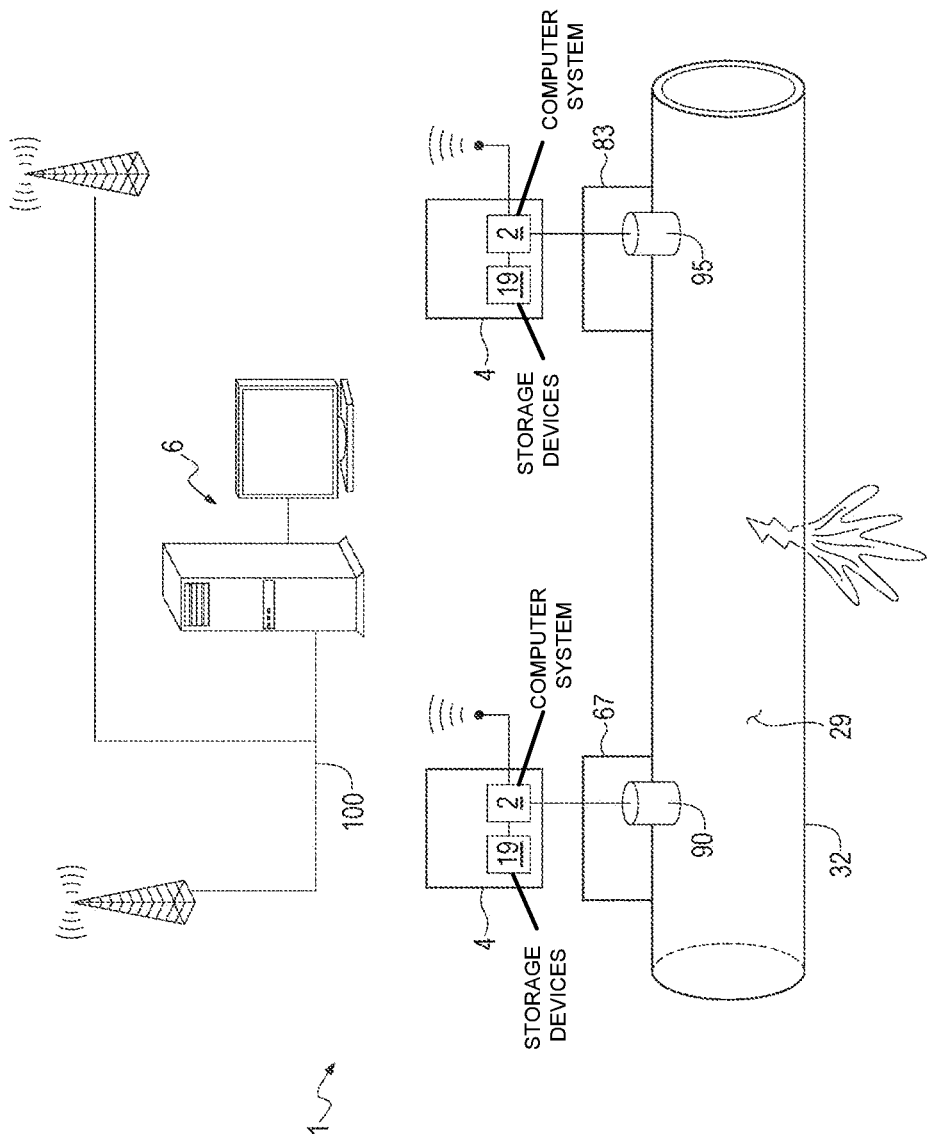

ULTRASONIC FLOW METER LEAK DETECTION SYSTEM AND METHOD

CROSS-REFERENCE TO RELATED APPLICATIONS

This application site the benefit of the filing date of provisional U.S. Patent Application No. 62/325,825, filed on 21 Apr. 2016.

FIELD OF INVENTION

The invention relates generally to the field of monitoring flow including detecting leaks in a conduit, such as water in utility network.

BACKGROUND

Leaks in conduits carrying fluid in a distribution network, including for example water, oil, or chemicals, can result in significant lost revenues and increased cost for the operator of the network, such as a water utility. Without a systematic method for detection and repair, leaks may go undetected for a prolonged period time and become worse, thereby exacerbating the loss of revenue and cost of repair.

To detect leaks, detection units and systems have been used that are temporarily clamped onto the pipe. However, such systems detect leaks only in the proximate location where they are clamped on and only for the period of time they are in use on the pipe. What is needed is a long-term leak detection method that does not require the use of temporary leak detection units as a first line of detection. Moreover, in order to implement the detection method in a cost-effective manner, it is preferable that the method make use of existing technology or infrastructure to avoid having to retrofit every conduit in a utility system with a new piece of leak detection equipment.

Flow meters are typically found in any fluid distribution network carrying any valuable commodity, such as water, gas, steam, oil, or other chemicals. Under typical use, a flow meter measures the fluid flowing past a certain point in the conduit, such as at a branch in the network, an entry or exit to a distinct section of a network, and at a point of consumption in the network such as the premises of a residential, business, or industrial consumer. In a water distribution network operated by a utility, a flow meter allows the utility to charge the customer for the water consumed. In the petrochemical context, a flow meter may allow an operator to meter production of oil pumped from an oil well. Flow meters present in the other locations of a distribution network monitor and meter fluid flow and usage across the network.

One type of flow meter used in fluid distribution networks is an ultrasonic flow meter. A typical ultrasonic flow meter has at least one pair of ultrasonic transducers on a segment of pipe or conduit, with one transducer located upstream and the other downstream with respect to the direction of fluid flow in the pipe. Each of the pair of ultrasonic transducers typically sends and receives an ultrasonic pulse, or series of ultrasonic pulses, back and forth. That is, the first transducer in the pair generates a pulse, or series of pulses, which is received by the other transducer. The time of flight of each pulse, or the average time of flight of the pulses in the series of pulses, is measured. The second ultrasonic transducer then sends a pulse, or series of pulses, to the first transducer. Again, the time of flight is measured. In operation, a typical flow meter sends these pulses in each direction at least two to four times per second, every second, which provides repetitive and regular readings of the flow rate. The fluid flow causes the pulses traveling downstream (i.e., with the fluid flow) to move faster, and those traveling upstream (i.e., against the fluid flow), to move slower, than the speed of sound in the static fluid. Thus, the rate of flow can be determined based upon the difference in flight time between the pulses moving downstream and those moving upstream. Because the speed of sound in a fluid is dependent on the temperature of the fluid, accuracy of the meter can vary with temperature if the meter is not calibrated to temperature. However, if properly calibrated, the flow meter accurately and non-invasively determines the flow rate at any given time, thereby allowing calculation of the water consumption during a chosen period of time.

Flow meters often include a meter interface unit (MIU) capable of receiving and storing flow information and other data from the meter register itself and communicating this information externally. The MIU may be integrated with the meter register or provided as a separate unit that interfaces with the meter register. A typical MIU includes a processor for carrying out prescribed measurement and housekeeping routines and for performing the actions instructed from external devices, and a memory or other data storage for storing consumption and other information related to such instructions. In many cases, an MIU includes a transceiver for sending and receiving communications to and from external devices over a communications network 100, which may be wired or wireless. Such external devices may include a handheld or mobile reader, a fixed collector or repeater installed in the network, MIUs of other meters, a host system, or any combination of these devices. Communications between or among devices may be direct or indirect according to various protocols that have been developed. A host system may receive flow information from a large network of flow meters across the distribution network. In a typical system, the host receives packets of information from flow meters and can cause instructions to be sent directly or indirectly to a particular meter or set of meters. Similarly, a mobile or handheld reader may be used by a technician to send instructions to or obtain information from one or more meters. A fixed network system using MIUs, collectors, and a host system is described in co-owned U.S. Pat. No. 8,350,717. It should be understood, however, that the teachings of this disclosure, and embodiments of the invention described herein are not limited to a system as described in the referenced patent and may be used with any other meter communications architecture and protocols, including for example mesh networks.

SUMMARY

Leak detection by use of ultrasonic transducers, as found in many type of flow meters, used as listening devices is disclosed.

In a first aspect, a method of detecting a leak in a pipe is provided, comprising listening to a first noise pattern of noise produced in the pipe, via an ultrasonic transducer, to detect noise that is characteristic of a leak.

In a second aspect, a method of detecting a leak in a pipe containing a fluid is provided, the method comprising: providing a first water meter comprising a first ultrasonic transducer and a second water meter comprising a second ultrasonic transducer, said first and second ultrasonic transducers separated by a length of the pipe; transmitting an acoustic signal from the first ultrasonic transducer to the second ultrasonic transducer; recording a travel time of the acoustic signal between the first ultrasonic transducer and the second ultrasonic transducer; and applying a saved correlation function to the travel time to compute an indicator of a location of a leak.

In a third aspect, a method of detecting the installation of a bypass conduit around a utility meter connected to a pipe containing fluid is provided, the method comprising listening via an ultrasonic transducer for a noise pattern characteristic of fluid flow during a period when the utility meter registers no flow of the fluid through the utility meter.

In a fourth aspect, a use of an ultrasonic transducer in a utility meter to passively listen for leakage noise is provided.

In a fifth aspect, a system for the detection of a leak in a fluid conduit is provided, the system comprising: a conduit containing a fluid; a first utility meter coupled to the conduit, the first utility meter comprising a first ultrasonic transducer positioned to receive sound from the fluid; a computing device connected to the first utility meter to receive data from the first utility meter; and a memory storage device accessible by the computing device, and comprising software that enables the computing device to detect a leak in the conduit based on the sound received from the fluid.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

FIG. 1: An embodiment of the system for the detection of a leak in a fluid conduit.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the apparatus is right side up.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

As described herein with respect to various embodiments of the present invention, leak detection can be accomplished by the modification and adaption of ultrasonic flow meter technology. This disclosure may describe embodiments of the present invention with respect to water distribution networks 65 as found in a water utility. However, it should be understood that the teachings of this disclosure and embodiments of the invention may be used in any conduit 32 through which fluid 29 regularly flows, including oil, gas, steam, or chemical pipelines or networks.

In some embodiments, the leak detection system 1 and methods disclosed herein, and their underlying functions and processes, are implemented in or performed by computer hardware and software, in a single computer system 2 in a meter 3 or MIU 4. In other embodiments, the leak detection system 1 and methods are distributed across computer systems 2 in a plurality of meters, MIUs 4, or devices in communication via a network 65. The host system 6 as referenced herein may itself be a distributed computer system 7, components of which may be located in the same facility or remotely from one another. Computing hardware may include single or multiple processors 8, and software may include firmware 9 or application software 10, or a combination thereof. Such processors 8 are capable of executing a program of instructions 11 contained in the software to perform embodiments of the method of the invention, or to provide embodiments of systems of the invention, as discussed herein. Such computer systems 2 include, in addition to processors 8, input 12 and output 13 devices, and memory 14 (such as a register 15, random access memory 16, read only memory 17, or other primary memory 18) and storage devices 19 (such as magnetic discs 20, optical discs 21, flash memory 22, and other secondary 23, tertiary 24, or offline memory 25) for storing instructions 26 and data 27.

Because an ultrasonic flow meter 28 takes flow measurements multiple times a second, the flow meter 28 can determine when there is a zero flow rate in the pipe 52. In a zero flow or "no flow" state, the fluid 29 carried in the pipe 52 is stationary or below the minimum velocity threshold that the meter 28 is capable of detecting. Zero flow states are common in single-family residences when the residents are away from the residence or asleep. Similarly, zero flow states are common for businesses that operate on fixed business hours when the business is closed.

An ultrasonic transducer 30 in an ultrasonic flow meter 28 converts acoustic signals to electrical signals or electrical signals to acoustic signals, for example by use of a piezoelectric crystal 31. In addition to sending and receiving specific acoustic signals for measurement of flow as described above, a transducer 30 may be used to "listen" for sound or noise occurring in the conduit 32, rather than the specific signals being passed back and forth between the transducer pair 33 for measuring flow rate. Because flow causes noise, it is advantageous to listen for leaks when the flow is low, near zero, or zero. It is also advantageous to record the flow rate along with the noise so comparisons can be made between noise levels with similar flow rates. In some cases, a small leak will create leak noise, even if the leak rate is sufficiently low that the meter registers a zero flow state made, which can be detected by the transducer 30 in a listening mode. Furthermore, even when a zero flow state does not occur for a given period (as may happen when a leak is downstream of the flow meter), the noise can be used to deduce the existence of a leak. For example, noise characteristics may be recorded during periods of non-zero flow, and compared to later periods of non-zero flow, in which the flow rates in the earlier and later non-zero flow periods are about the same. Although different rates of flow would be expected to create different flow noise patterns, any difference in noise patterns during periods of equal flow would be attributed to something other than the flow itself, such as a leak (or a change in a pre-existing leak).

In some embodiments of the system 1, leak noises may be compared at different points in time to evaluate a change in the leak. For example, as the rate of leak flow increases, the frequency of the leak noise decreases; consequently a decrease in leak noise frequency in a given length of conduit 32 could indicate a leak of increasing size.

In one embodiment of the invention, the flow meter 28 determines when or whether a zero flow state exists. To do so, the flow meter 28 may take a number of consecutive readings 44 showing that zero flow is occurring. For example, if the sample frequency for metering flow rate is four samples per second, and a zero flow state is deemed to exist when there is a three-second period of no flow, then twelve consecutive readings 44 of no flow would be required to trigger the flow meter 28 into a zero flow state mode (ZFSM). This sample rate and determinative period are exemplary only, and a higher or lower sample frequency, and a longer or short determinative period may be used. When the flow meter 28 determines that a zero flow state exists, the flow meter 28 may enter into ZFSM. In ZFSM, the transducers 33 may reduce the frequency of flow sampling, or cease flow rate sampling altogether for a predetermined period of time. Instead, one 30 or both ultrasonic transducers 33 are set to listening mode, either simultaneously or alternating. While in listening mode, the listening transducer 78 records a sample of the background acoustic noise for a period of time. That is, the receiver circuitry associated with each ultrasonic transducer 30 is powered such that acoustic signals in the conduit 32 are transformed by the transducer 30 to electrical signals, which are sampled or recorded and stored in memory 14. The device thus measures and records the background acoustic noise level at zero flow. The transducer 30 may record one or more samples of background noise for comparison against each other over time, or against one or more benchmark noise samples stored in memory 14 that are indicative of a leak or non-leak state. Such benchmark samples may be determined empirically by gathering samples recorded by comparable ultrasonic transducers 30 in comparable settings, from which signatures indicative of leaks 42 may be determined.

Alternatively, a shorter period may be used to determine that a zero flow state exists, for example, based on upon only one or two flow readings 44. In this alternative procedure, after a minimal number of flow readings 44 indicating zero flow, the device 28 may enter ZFSM and the transducers 33 record a sample of the background acoustic noise. The flow sensors 34 then measure the flow following the listening sample. If the flow still measures at zero, then it is assumed that the background noise was sampled at zero flow as well and the recording 35 is saved by the processor 8. If the next flow measurement is not zero, then the recording 35 is discarded and rescheduled.

This listening period in ZFSM may be structured in a number of ways to minimally inhibit the normal functioning of the flow meter 28. Because the flow measurement process is intermittent and uses only a portion of the available time, the listening and leak detection can be scheduled during the intervals between flow measurement events. Alternatively, when there is a long period of constant flow rate, the listening protocol can be performed in the middle of such known period of time, by skipping one or more flow measurement events. Leak detection can also be scheduled by the sensor processor 8 to occur at specific times, anywhere from once every several minutes to once a day, depending on the priority of such detection, the need to minimize power consumption, or other factors. If the flow rate at the time of a scheduled leak detection event is not conducive to leak detection (for example, it is too high or unstable, based on several flow readings 44 leading up to the event), then the processor 8 may be programmed to reschedule the leak noise measurement for a future time.

Over time, the ultrasonic flow meter 28 will have recorded several samples of background acoustic noise during a zero flow state. These samples may be electronically analyzed and compared to determine changes in the background acoustic noise that may indicate the existence of a leak. Typically, in normal non-leak flow, the frequency content of the noise signal and the amplitude are correlated. For example, the sensor 47 may measure the total noise amplitude or power over a given bandwidth, and then compare the noise or power signature change as a function of time. If computational power is available, more computationally intensive power spectral density measurements may be used to more accurately distinguish the elements of leak noise. Within a single meter 28, cross-correlation would allow detection of the direction toward the leak. Comparison of leak noise amplitudes and power spectral density characteristic can also be used to estimate the position of a leak between meters 28. However, the data reduction involved in power spectral density measurement or correlation function calculations will typically require multiple discontinuous computation periods interspersed between scheduled flow measurements. In applications where the flow rate is irregular or unpredictable, the time at which there may be zero flow is also unpredictable. Where this is likely to occur, the sensor processor 8 can report to the host server 36 the time when zero flow state occurs, thereby indicating the time of such occurrence and taking leak detection readings 37 at that time. In addition to these simpler measurements, the sensor 47 can report the noise amplitude or power over a spectrum of sub-bands 38 within the measuring bandwidth. For example, analog filters 39 or digital filters 40, or Fourier transforms 41 of the measured noise signature 42 could allow for a spectrum analysis of the raw data 43. Lastly, in addition to correlating data between multiple sensors 47, flow readings 44 or leak noise readings 45 from multiple sensors 47 could also be compared with data from other systems (for example, pumps, valves, or pressure control systems) to identify when water should or should not be flowing or compare the expected for versus actual flow rates. This further assists in locating and identifying the size of a leak.

For single-meter noise 45 and flow readings 44, a change in the nature of the correlation indicates a potential leak. For example, typically, the amplitude of noise caused by a leak increases over time. Therefore, an increase in noise amplitude is indicative of a leak. Also, if the amplitude is fairly continuous but the frequency decreases, this may indicate that the leak is getting larger. It has been found that higher frequencies dominate in small leaks, but frequencies decrease as leaks grow. The transducers' 30 transfer function and performance characteristics preferably are taken into account in the foregoing process. Ultrasonic transducers 30 typically operate optimally within a defined bandwidth around a particular center frequency 46. For example, an ultrasonic meter sensor 47 typically uses a transducer 30 with a best operating frequency (resonance 48) between 500 kHz and several megahertz, but the piezoelectric effect that produces the transducer readings extends to lower frequencies. Noise having a frequency near the center frequency 46 is more accurately captured than noise having a frequency beyond the optimal bandwidth of the transducer 30. This may result in the transducer 30 capturing the amplitude of frequencies of the noise signal well beyond the transducer's optimal bandwidth. However, this is repeatable and can be corrected or otherwise taken into account in analyzing the frequency content of the signal. In addition, a high impedance amplifier 49 or a charge amplifier 50 can produce a voltage or current proportional to the charge movement at non-optimal frequencies, as is commonly done in vibration measurement systems 51 for increased sensitivity of the transducers 30 at frequencies greatly exceeding the transducer resonant frequency 48. A seismic mass on the back of the piezoelectric element can also be used to make the sensor more sensitive to fluid vibrations. However, the inventors have found that this also provides increased sensitivity at low frequencies as well.

The embodiment described above uses the zero flow state to prompt the flow meter 28 to enter into ZFSM. If changes in the background acoustic noise are indicative of a leak, and this exists during a zero flow state, then the leak is most likely upstream within the pipeline 52 from the flow rate meter 28. This is because if the leak were downstream 64 of the flow meter 28, a zero flow state theoretically should never exist; the leak would result in a continuous flow at low amounts, even during periods when a zero flow state would be expected. However, the flow rate caused by a downstream leak 64 may be below the minimum velocity detectable by the flow meter 28, in which case a zero flow state will be realized despite the presence of a downstream leak 64. Regardless of the location of the leak, when an analysis of the acoustic samples indicates the presence of a leak, the flow meter 28 (typically through its MIU 4) preferably will include an alert flag 53 or other indicator in a data packet 54 transmitted to the host system 6 or other external device via the communications network 100.

This information may be communicated to the host system 6 or other device over the communications network 100 in a variety of ways, as may best suit a particular application or user requirement. As described above, flow meters 28 typically communicate water consumption data 55 periodically on regular intervals. Data regarding leak detection can be sent in the same packet 57 or in a separate packet 58 as the consumption data 55. In one embodiment, for example, the standard consumption data packet 59 may include one or more bits corresponding to a flag that a leak has been detected. In this embodiment, a network device receiving the communication (such as a reader 60 or fixed network collector 61) may respond to the leak flag 53 by instructing the MIU 4 to transmit the contents of its memory 14 corresponding to leak detection data 56, i.e., the acoustic samples recorded during the zero flow state mode. In another embodiment, the MIU 4 may send a packet having a separate data structure with more detailed information about the leak, if supported by the battery 62 power for the MIU 4 and limitations in the RF bandwidth frequency 63.

Where a downstream leak 64 is large enough that it creates a situation where a zero flow state does not occur for a prolonged period of time, or where the customer is one where water flows continuously, then the flow meter 28 would not enter into ZFSM and sample background noise. Therefore, in order to make sure that such a leak is detected, in another embodiment, the meter 28 may be programmed to alert the host system 6 or other external device of a possible leak if a zero-flow state is not detected during a defined period of time. In a typical residence or business, there will be times when there is no actual consumption of water in the building, which should result in a zero flow state at least for the flow meter 28 nearest to the building. However, if the meter 28 does not detect a true zero flow state over a predetermined period of time and is always detecting some minimal flow rate, this indicates the possibility of a leak inside the building, downstream 64 from the flow meter 28. Similarly, if the minimum flow rate detected by the meter 28 were continuous, or nearly continuous, over a predetermined time period, this too would indicate the presence of a possible downstream leak 64. Moreover, flow rate data may be compared with historical consumption patterns at that location to identify time periods in which zero flow should be expected. If there is continuous flow during these time periods over some predefined duration, this would indicate a leak in the building. Optionally, where a zero flow state does not occur for a defined period of time, the flow meter 28 may be programmed to enter into listening mode and sample the background acoustic noise at or near the minimum recently stored flow rate. This sample may also be compared against prior samples to determine whether a leak is present. In any case, once a potential leak is identified, the MIU 4 of the flow meter alerts the host system 6 by including an alert flag 53 or other indicator by one of the methods described above.

In either embodiment described above, when the host system 6 or other device receives a leak alert flag 53 or indicator, the host system 6 or device may notify a technician or other user of the presence and approximate location of the leak. A technician may then physically go to the location and verify the existence and more precise location of the leak.

Optionally, however, another embodiment of the present invention may be utilized to locate the leak more accurately. In this embodiment, two or more flow meters 28 in the meter network 65 enter into an active leak-locating mode to verify the leak and more closely approximate its location without (or before) a physical site visit by the user. The meters 28 may be instructed to enter into leak detection mode by the host system 6, by a technician via a mobile reader 66, or the meters 28 themselves may be programmed with instructions 26 causing it to enter leak detection mode if certain conditions are met, such as the size of an apparent leak, changes in the size of an apparent leak, or length of time over which an apparent leak is detected. This protocol has the advantage of proximally locating the leak in order to reduce time later required by the user to physically locate the leak on premises. To locate the leak, the flow meter 67 that initially detected the leak (the "originating" flow meter) and at least one flow meter 83 either upstream or downstream in the meter network 65 of the originating flow meter 67 enter active leak detection mode. Preferably, at least one of the meters 83 entering active leak detection mode are the flow meters that are closest to the originating meter 67 in the upstream and/or downstream direction of the pipe 68. Instructions 26 may be transmitted to these meters 83 from the host 36, from a technician via a mobile reader 66, or the originating meter 67 may initiate the process.

The meters 83 tasked with locating the leak enter into active leak locating mode. In active leak locating mode, a transducer 90 of the originating meter 67 emits a signal 69 to be received by a transducer 95 in the other meter(s) 83 that have been instructed to enter active leak locating mode. This signal 69 is at a higher power than the signals transmitted between the transducers 30 in a single flow meter 28 for flow rate detection. In a non-limiting prophetic example, in this mode the synchronization would involve the MIU 4 keeping a real-time clock 79 to signal both the upstream and downstream units to go into leak locating mode (LLM) and to signal one of the units to transmit first. Pulses from the first meter 67 ("meter A") would received at the second meter 83 ("meter B") and time of flight and amplitude would recorded. Then pulses from meter B (83) would be received by A (67) and the time of flight and amplitude would be recorded. From this, the acoustic distance between the two meters 67 and 83 can be calculated given the time of flight information. Then the amplitude of the leak at both locations can be compared, and based on the difference in levels the distance of the leak between the two meters 67 and 83 as the pipe flows can be approximated. The amplitude data from the back and forth handshake between A (67) and B (83) can be used to further refine this estimation.

Because of the length of the signal, meters 28 operating in active leak locating mode are not operating in their normal flow rate measuring (metering) mode. Accordingly, the software implementing the method of this embodiment, whether in the host system 6, a reader 60, or MIU 4 of a meter 28, may be configured to time the implementation of the active leak location protocol to run during periods of low or zero flow states, such that consumption data 55 is minimally affected. However, this is not necessary in all situations, and in fact in some cases (such as where a major leak has been detected) immediate detection of the location would be preferred. The timing of the use of leak locating mode is ultimately at the discretion of the user and may be configured based on the needs of a particular system or user.

In active leak locating mode, at least one transducer 95 at an upstream or downstream meter 83 receives the signal 69 emitted from the originating water meter 67 and then transmits back a signal to the originating meter 67. By comparing the signals as received by each meter 83, the location of the leak can be determined, at least to the level of the network segment 70 containing the leak. For example, a correlation function can measure the relative time of arrival of events at two different points. Consider a system with a left piezoelectric sensor 71 designated as Left, and a right piezoelectric sensor 72 designated Right, separated by signal time of flight of 60 microseconds (which is the typical spacing in a single ultrasonic meter). If the leak were to the left of sensor Left 71, the correlation function would peak at −60 microseconds. If the leak were to the right of sensor Right 72, the correlation function would peak at +60 microseconds. If the leak were between the Right (72) and Left (71) sensors, the correlation function would peak between −60 microseconds and +60 microseconds according the relative distance of the leak to both of the sensors 71 and 72. Using this measurement within a meter could be used to indicate the location of a leak as in the house 73 or in the water main 74. For leaks between two sensors (71 and 72), precision synchronization would be required. The precision synchronization procedures are well known in the art, and are commonly used for leak location where two sensors 71 and 72 are plunged into the ground to discover the relative direction and distance of the leak from the two probes 82. Once a proximate location has been determined, personnel can bring other leak-detection devices known in the art (such as a clamp-on, mobile detector) to pinpoint the leak location.

In addition to active leak location mode, a passive leak location mode can also be used. In the passive mode, a number of transducers 30 in the meter network 65 in the vicinity of the originating meter 67 are instructed to enter listening mode at approximately the same time. Preferably this is at a time of low-flow or zero-flow period (such as during the night) to minimize routine noise signals associated with water flow. Because the amplitude of the noise associated with the leak decreases as the distance from the leak increases, those meters that are closest to the leak 75 will record higher amplitudes of noise. Thus, a region for the leak can be narrowed to an area of the network 65 between 2 or 3 meters 28. Because the acoustic environment will vary greatly between different meter installations, this method may not be very accurate, but it does allow for a rough determination of the leak location. The advantage of the passive leak location mode is that the listening protocol can be done on the same short time span as used in ZFSM, rather than the longer time span associated with the active location mode described above. Therefore the meters 28 are out of service for water consumption use for a much shorter period. On the other hand, the active leak location mode is typically more accurate than the passive mode. The active and passive modes can also be used in tandem; passive mode may be used first to establish a preliminary region for further detection, and then the meters 28 in the region can be instructed to enter active detection mode to more accurately locate the leak.

In addition to leak location, the systems 1 and methods described above may also be employed to detect water theft. For example, a person may construct a bypass conduit 32 that diverts fluid flow around a meter in the supply line 76 at the person's premises and may install a valve 77 in the supply line 76 upstream or downstream of the meter to regulate or cut off flow through the meter 28. The fluid pressure in the line maintains fluid 29 in the meter, but when fluid 29 is diverted through the bypass 32, the flow rate across the meter 28 will be less than the actual flow to the premises or zero if the valve 77 in the supply line 76 is closed. In such situations, the amplitude of the noise caused by the actual flow does not correlate with the flow rate measured by the meter 28. If a valve 77 is closed entirely such all fluid 29 flows through the bypass 32 and none through the meter 28, the meter 28 will enter ZFSM as described above and the transducers 30 will record the background noise levels. In accordance with embodiments of the methods described above, the noise caused by the flow through the bypass conduit 32 will be detected as a "leak." Subsequent analysis by the system user can determine that the leak in this case is related to theft, rather than some other cause.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed:

1. A method of detecting a leak in a pipe comprising:
   transmitting, by a first ultrasonic transducer, a first ultrasonic signal to a second ultrasonic transducer, wherein the second ultrasonic transducer is located downstream of the first ultrasonic transducer with respect to a direction of a fluid flow in the pipe;
   transmitting, by the second ultrasonic transducer, a second ultrasonic signal to the first ultrasonic transducer;
   determining, based on a difference in a time of flight between the first and second ultrasonic signals, a first flow rate of fluid in the pipe;
   detecting a first noise pattern of noise produced in the pipe at the first flow rate of fluid in the pipe, via at least one of the first ultrasonic transducer or second ultrasonic transducer;
   recording the first flow rate;
   recording the first noise pattern;
   determining, at a second period of time and based on information from the first and second ultrasonic transducers, a second flow rate of fluid in the pipe that is about equal to the first flow rate;
   detecting, at the second period of time, a second noise pattern of noise produced in the pipe at the second flow rate of fluid in the pipe, via at least one of the first ultrasonic transducer or second ultrasonic transducer; and
   comparing the first noise pattern to the second noise pattern to detect a leak during the second period of time.

2. The method of claim 1, wherein the first flow rate corresponds to a zero flow state.

3. The method of claim 1, further comprising:
   detecting the leak based on identifying a difference between the first noise pattern and the second noise pattern.

4. The method of claim 1, further comprising:
   comparing the frequency of the first noise pattern to the frequency of the second noise pattern to detect a change in the rate of the leak.

5. The method of claim 1, wherein each of the first and second ultrasonic transducers do not transmit a signal while detecting the first noise pattern.

6. A system for detecting a leak in a conduit, the system comprising:
   a first ultrasonic transducer;
   a second ultrasonic transducer located downstream of the first ultrasonic transducer with respect to a direction of a fluid flow in the conduit,
   wherein the first ultrasonic transducer is configured to transmit a first ultrasonic signal to the second ultrasonic transducer,
   wherein the second ultrasonic transducer is configured to transmit a second ultrasonic signal to the first ultrasonic transducer; and
   a processing device configured to:
      determine, based on a difference in a time of flight between the first and second ultrasonic signals, a flow rate of fluid in the conduit,
      identify a zero flow state with respect to fluid flow in the conduit,
      set at least one of the first ultrasonic transducer or second ultrasonic transducer to a listening mode in response to identifying the zero flow state, and
   wherein at least one of the first ultrasonic transducer or second ultrasonic transducer is further configured to:
      detect, while in the listening mode, a first noise pattern of noise produced in the conduit, wherein the first noise pattern is characteristic of a leak in the conduit.

7. The system of claim 6, wherein the first and second ultrasonic transducers are included in a utility meter coupled to the conduit.

8. The system of claim 6, wherein the processing device is included in a meter interface unit of a utility meter.

9. The system of claim 6, wherein the processing device is further configured to connect to a host system via a communications network.

10. The system of claim 6, wherein the processing device is further configured to:
    record the first noise pattern,
    record a second noise pattern received from one of the first or second ultrasonic transducers at a later time, and
    compare the first noise pattern to the second noise pattern to detect a leak present at the later time.

11. The system of claim 6, wherein the processing device is further configured to:
    record the first noise pattern,
    record a second noise pattern at a later time, and compare the frequency of the first noise pattern to the frequency of the second noise pattern to detect a change in the rate of a leak.

12. A system for detecting a leak in a pipe, comprising:
a first ultrasonic transducer;
a second ultrasonic transducer located downstream of the first ultrasonic transducer with respect to a direction of a fluid flow in the pipe,
wherein the first ultrasonic transducer is configured to transmit a first ultrasonic signal to the second ultrasonic transducer, and
the second ultrasonic transducer is configured to transmit a second ultrasonic signal to the first ultrasonic transducer; and
a processor configured to:
 determine based on a difference in a time of flight between the first and second ultrasonic signals, a first flow rate of fluid in the pipe, and
 record the first flow rate,
wherein at least one of the first or second ultrasonic transducer is further configured to:
 detect a first noise pattern of noise produced in the pipe at the first flow rate of fluid in the pipe,
wherein the processor is further configured to:
 record the first noise pattern, and
 determine, at a second period of time and based on information from the first and second ultrasonic transducers, a second flow rate of fluid in the pipe that is about equal to the first flow rate,
wherein at least one of the first or second ultrasonic transducers is further configured to:
 detect, at the second period of time, a second noise pattern of noise produced in the pipe at the second flow rate of fluid in the pipe, and
wherein the processor is further configured to:
 compare the first noise pattern to the second noise pattern to detect a leak during the second period of time.

13. The system of claim 12, wherein the first flow rate corresponds to a non-zero flow rate.

14. The system of claim 12, wherein the first flow rate corresponds to a zero flow rate.

* * * * *